(12) United States Patent
Puch

(10) Patent No.: US 6,592,462 B2
(45) Date of Patent: Jul. 15, 2003

(54) COMPRESSED FLUID PROPELLED AMUSEMENT RACING VEHICLE CAPABLE OF MOVING HUMAN OCCUPANT DRIVER/RIDER

(76) Inventor: Len Puch, 37852 S. Huron Rd., New Boston, MI (US) 48164

( * ) Notice: Subject to any disclaimer, the term of this patent is extended or adjusted under 35 U.S.C. 154(b) by 0 days.

(21) Appl. No.: 10/005,013

(22) Filed: Dec. 4, 2001

(65) Prior Publication Data

US 2002/0068643 A1 Jun. 6, 2002

Related U.S. Application Data

(60) Provisional application No. 60/251,268, filed on Dec. 4, 2000.

(51) Int. Cl.$^7$ ................................................. A63G 1/08
(52) U.S. Cl. ........................ 472/43; 472/134; 104/23.2; 104/155
(58) Field of Search .................. 472/43, 134; 104/23.1, 104/23.2, 53, 77, 78, 86, 154, 155, 156, 159, 157

(56) References Cited

U.S. PATENT DOCUMENTS

| | | | | | |
|---|---|---|---|---|---|
| 3,547,042 | A | * | 12/1970 | O'Connor | 104/155 |
| 4,662,282 | A | * | 5/1987 | Fukuwatari | 104/23.2 |
| 4,774,891 | A | * | 10/1988 | Coester | 104/130.01 |
| 6,176,788 | B1 | * | 1/2001 | Checketts | 104/138.1 |
| 6,213,026 | B1 | * | 4/2001 | Coester et al. | 104/140 |

* cited by examiner

Primary Examiner—Kien T. Nguyen
(74) Attorney, Agent, or Firm—Warn, Burgess & Hoffmann, P.C.

(57) ABSTRACT

An amusement ride that simulates the sport of drag racing. The ride includes a vehicle propelled by a compressed fluid system. They compressed fluid system includes a pressure sleeve slid over and receiving pressure from a pressure tube. The vehicle is attached to the pressure sleeve such that pressure entering the pressure sleeve through the pressure tube from a pressure source causes separation of the pressure tube and pressure sleeve thereby moving the vehicle. The compressed fluid system further includes a main dump valve operative to supply pressure to the pressure tube on demand. Accordingly, the release of pressure into the pressure sleeve causes the vehicle to rapidly accelerate and simulate the sport of drag racing.

19 Claims, 7 Drawing Sheets

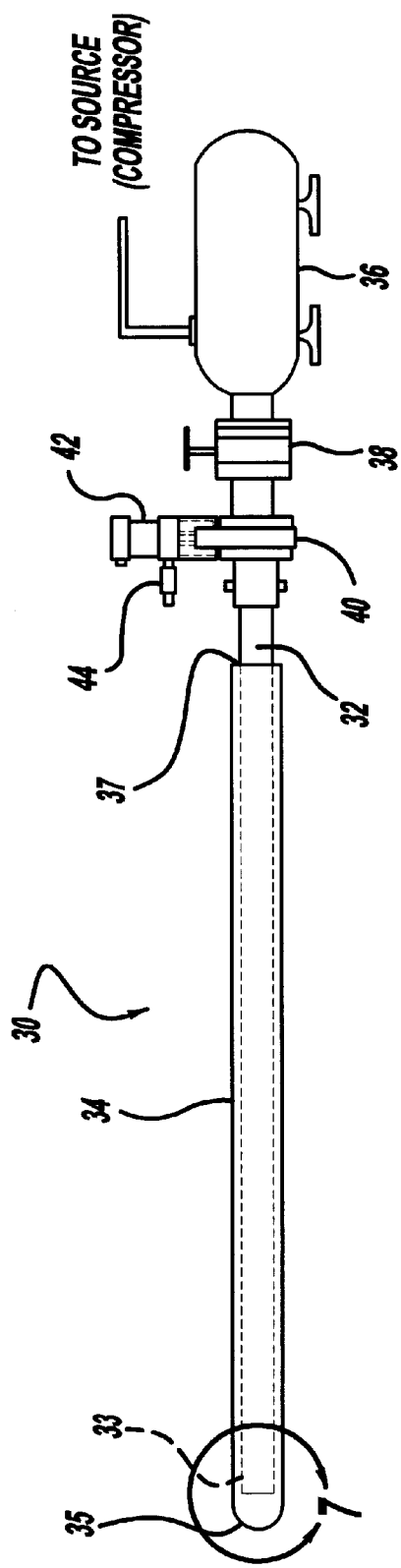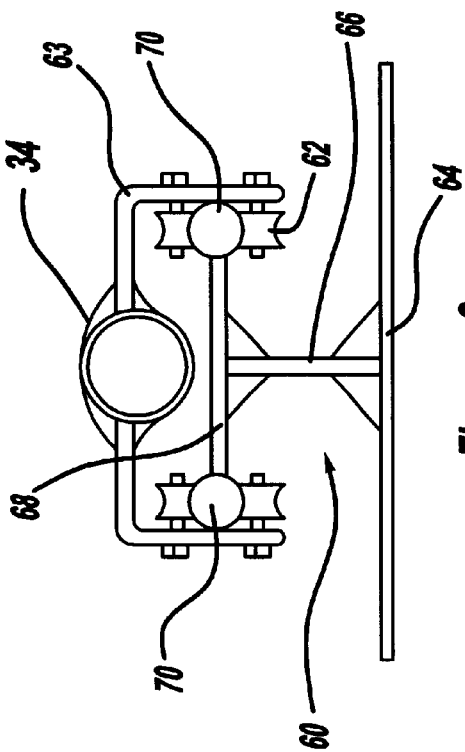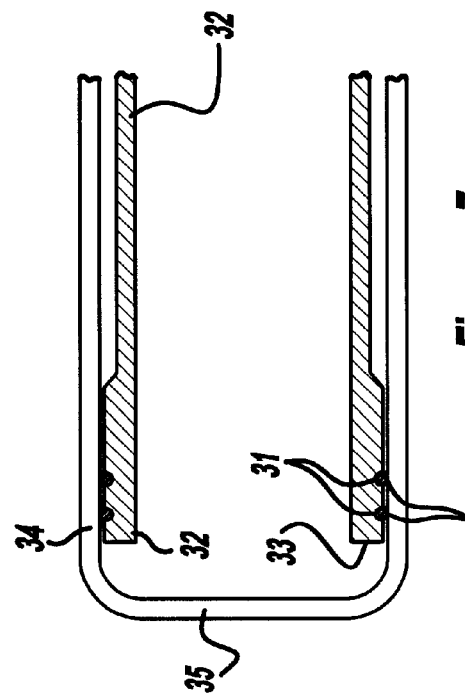

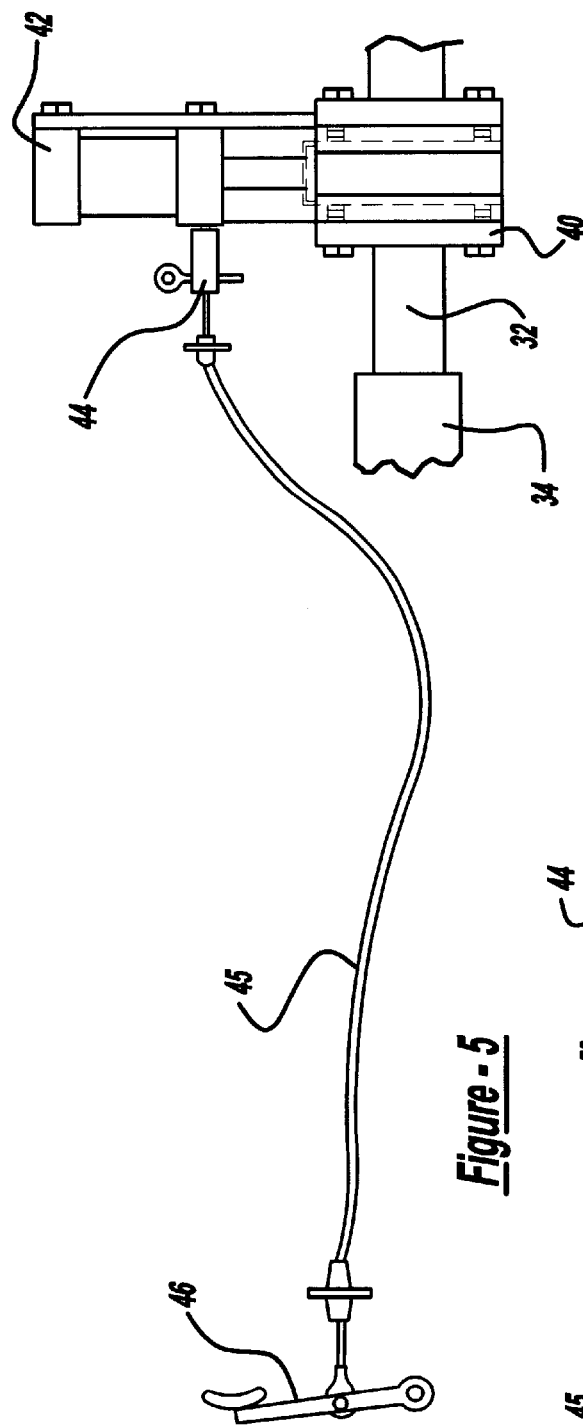
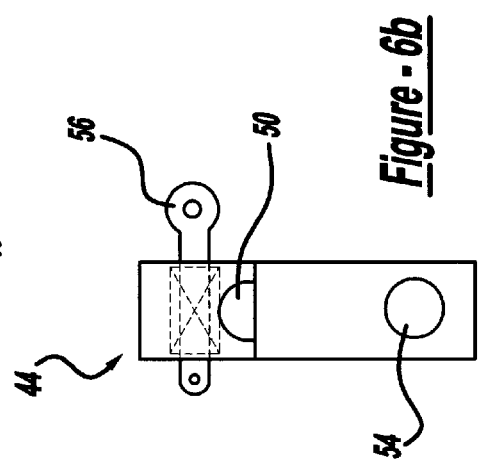
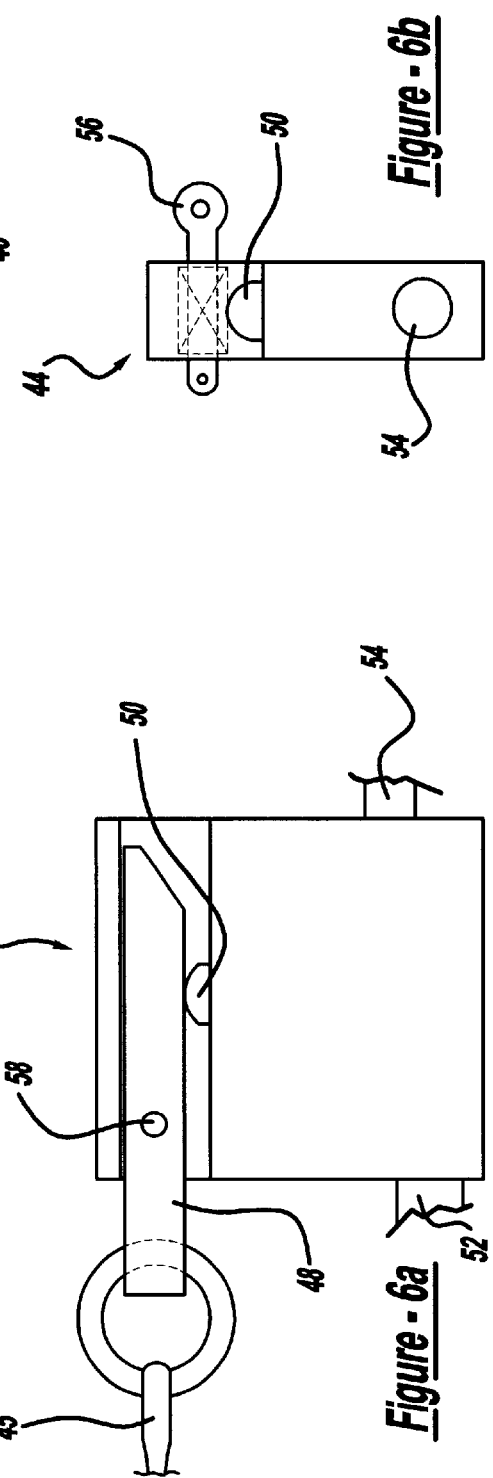

US 6,592,462 B2

COMPRESSED FLUID PROPELLED AMUSEMENT RACING VEHICLE CAPABLE OF MOVING HUMAN OCCUPANT DRIVER/RIDER

BACKGROUND OF THE INVENTION

This application is based on and claims priority in U.S. Provisional Patent Application Ser. No. 60/251,268 filed Dec. 4, 2000.

1. Field of the Invention

This invention relates to an amusement ride and more particularly to a vehicle for carrying a rider wherein a compressed fluid propels the vehicle.

2. Description of the Related Art

Amusement rides typically subject the rider to various forms of acceleration and rapid movement. The sport of drag racing utilizes a high-powered vehicle that rapidly accelerates from a starting point over a straight-line course. The driver is subjected to acceleration forces while having to steer the vehicle down the course.

Various amusement rides exist that attempt to simulate the sport of drag racing. However, there exists a need for an amusement ride that accurately simulates a real drag race wherein the vehicle operator/driver experiences the thrill of acceleration while maintaining control of the vehicle.

SUMMARY OF THE INVENTION

The present invention provides an amusement ride wherein a vehicle is propelled by a compressed fluid. The ride includes a compressed fluid system having a pressure tube, a pressure sleeve, and a pressure tank. The pressure tube is secured to the pressure tank and the pressure sleeve is secured to the vehicle. Accordingly, since the pressure tank and pressure tube remain stationary, pressure released from the pressure tank into the pressure tube causes the pressure sleeve and corresponding vehicle to separate from the pressure tube and thus propel the vehicle.

Other features and advantages of the present invention will be readily appreciated, as the same becomes better understood after reading the subsequent description taken in conjunction with the accompanying drawings.

BRIEF DESCRIPTION OF THE DRAWINGS

FIG. 4 is a schematic view of the compressed fluid system used to power the vehicle of the amusement ride according to the present invention;

FIG. 5 is a schematic side view of an actuation assembly including a pedal control for use with an amusement ride according to the present invention;

FIG. 6a is a schematic top view of a switch assembly for use with an amusement ride according to the present invention;

FIG. 6b is a schematic side view of a switch assembly for use with an amusement ride according to the present invention;

FIG. 7 is a schematic cross-sectional view of the ends of the pressure tube and pressure sleeve taken in the circle 7—7 of FIG. 4;

FIG. 8 is a cross-sectional view of a track mounted version of an amusement ride according to the present invention;

DETAILED DESCRIPTION OF THE PREFERRED EMBODIMENT(S)

Figure 1:
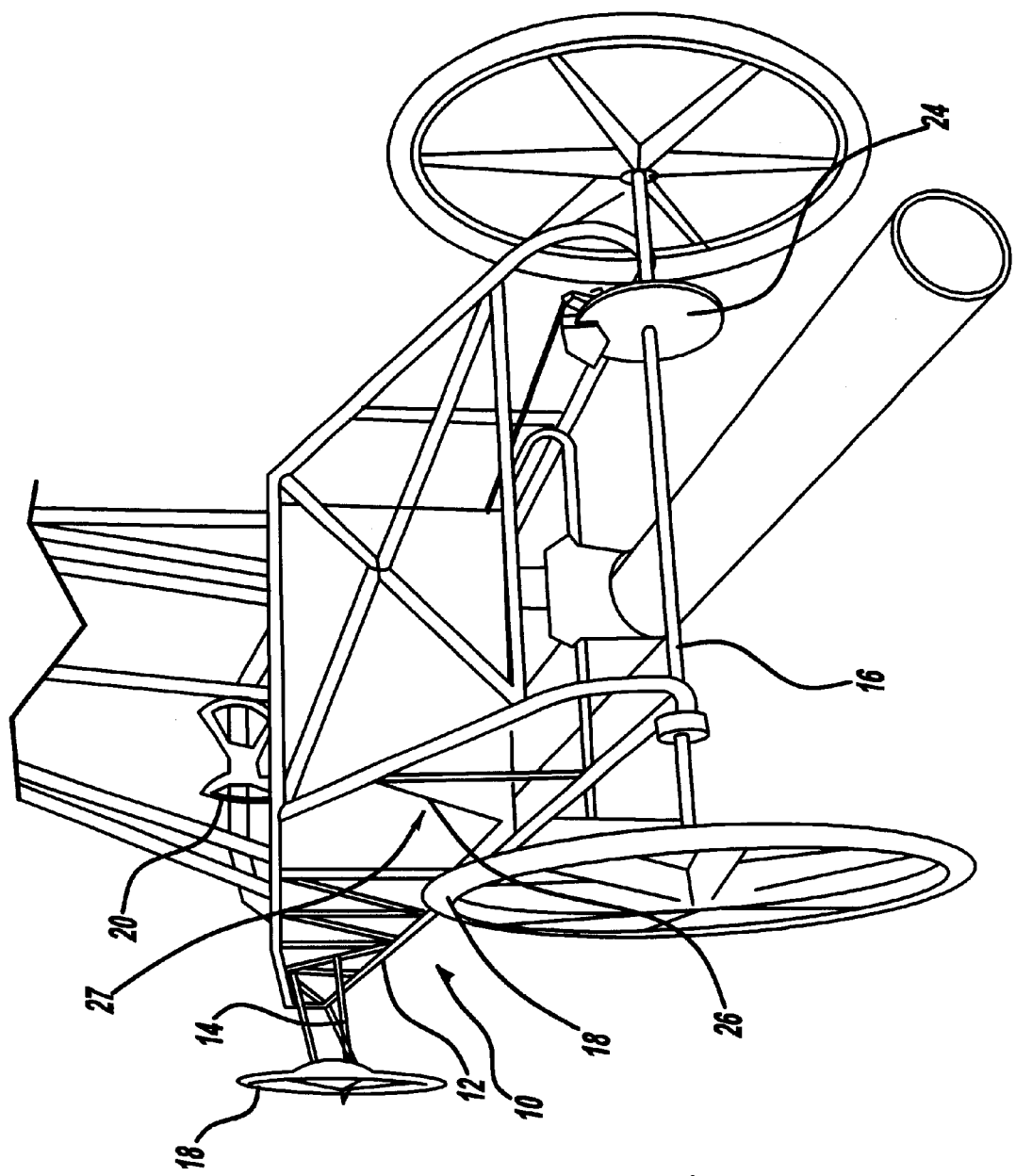
FIG. 1 is a perspective view of a vehicle according to an amusement ride of the present invention.
Figure 2A:
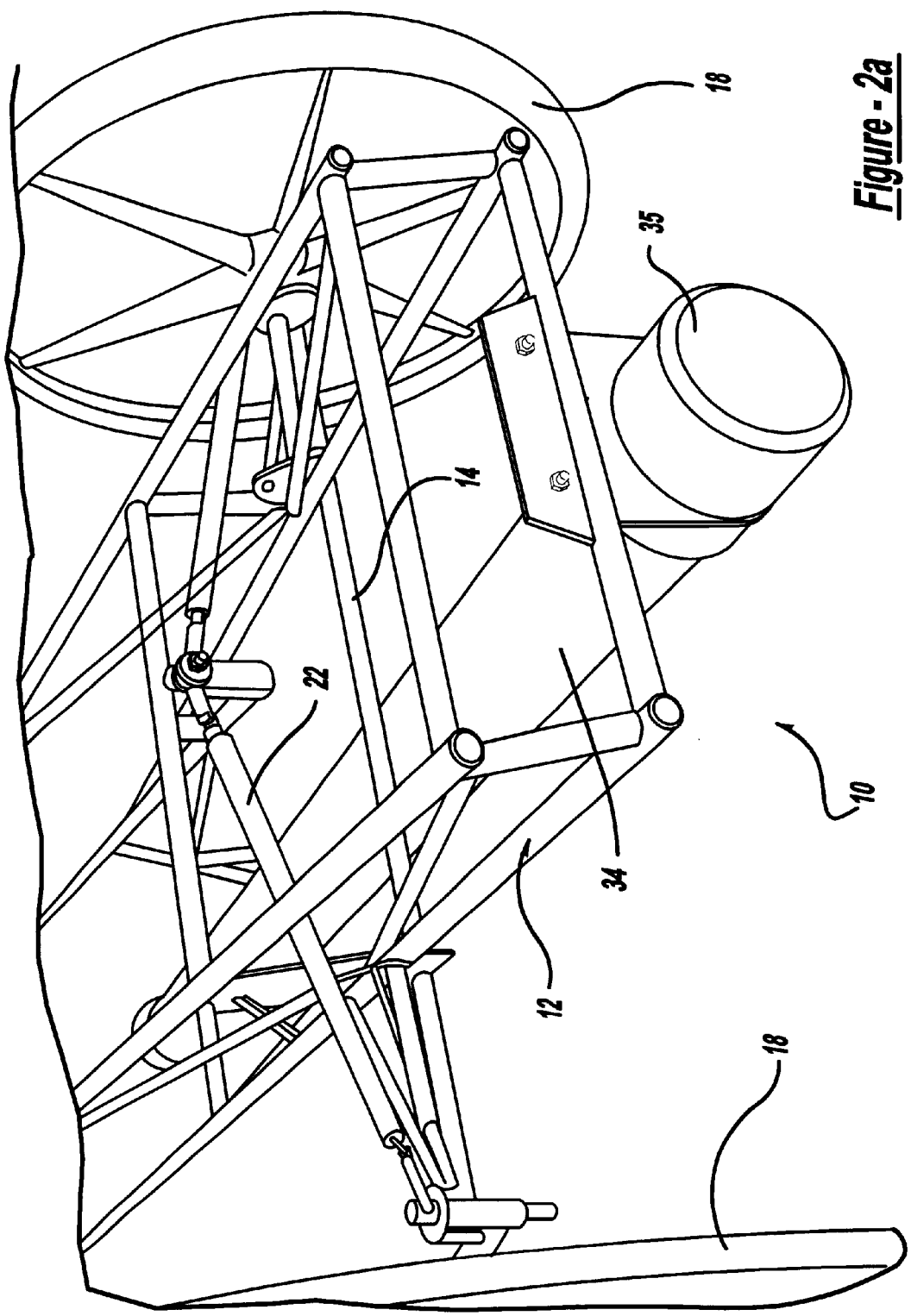
FIG. 2a is a partial perspective view of the front end of the vehicle of FIG. 1.

In the preferred embodiment, shown in FIGS. 1–2, a vehicle 10 includes a frame 12 supporting front 14 and rear 16 axles. Wheels 18 are rotatably attached to the front 14 and rear 16 axles. A steering wheel 20 attached to the frame 12 is connected through a steering linkage 22 to control and steer the front wheels 14. The vehicle 10 also includes a brake 24, shown in the present embodiment, as a disc type brake assembly. The vehicle 10 further includes a seat 26 mounted within an operator/driver compartment 27 of the frame 12. Accordingly, an operator/driver is seated in the operator/driver compartment 27 and grasps the steering wheel 20 to pilot the vehicle 10. The operator/driver of the vehicle 10 operates the brake 24 through a hand lever 28 to slow or stop the vehicle 10. The brake 24 may also be operated by a mechanism including a foot pedal, attached via a suitable connection or actuation means such as a cable, to the brake 24. A compressed fluid system 30 including a pressure tube 32 and a pressure receiver or sleeve 34 propels the vehicle 10 through a sudden release of pressurized fluid which provides a force to rapidly accelerate and move the vehicle 10 in a manner that simulates the operation and feeling of a drag racer. As used herein the term pressure receiver includes any apparatus or device that is capable of fitting together with the pressure tube 32. For instance, it is contemplated that instead of using sleeve member, a plug member or piston could be inserted within the pressure tube 32 and would perform the very same function as the pressure sleeve; i.e., transmitting the force from the pressure tube 32. Such a use would be substantially equivalent to use of the sleeve and is contemplated as coming within the scope of the invention. In the preferred embodiment the pressure receiver and the pressure tube 32 fit together in a telescopic relationship.

Figure 2B:
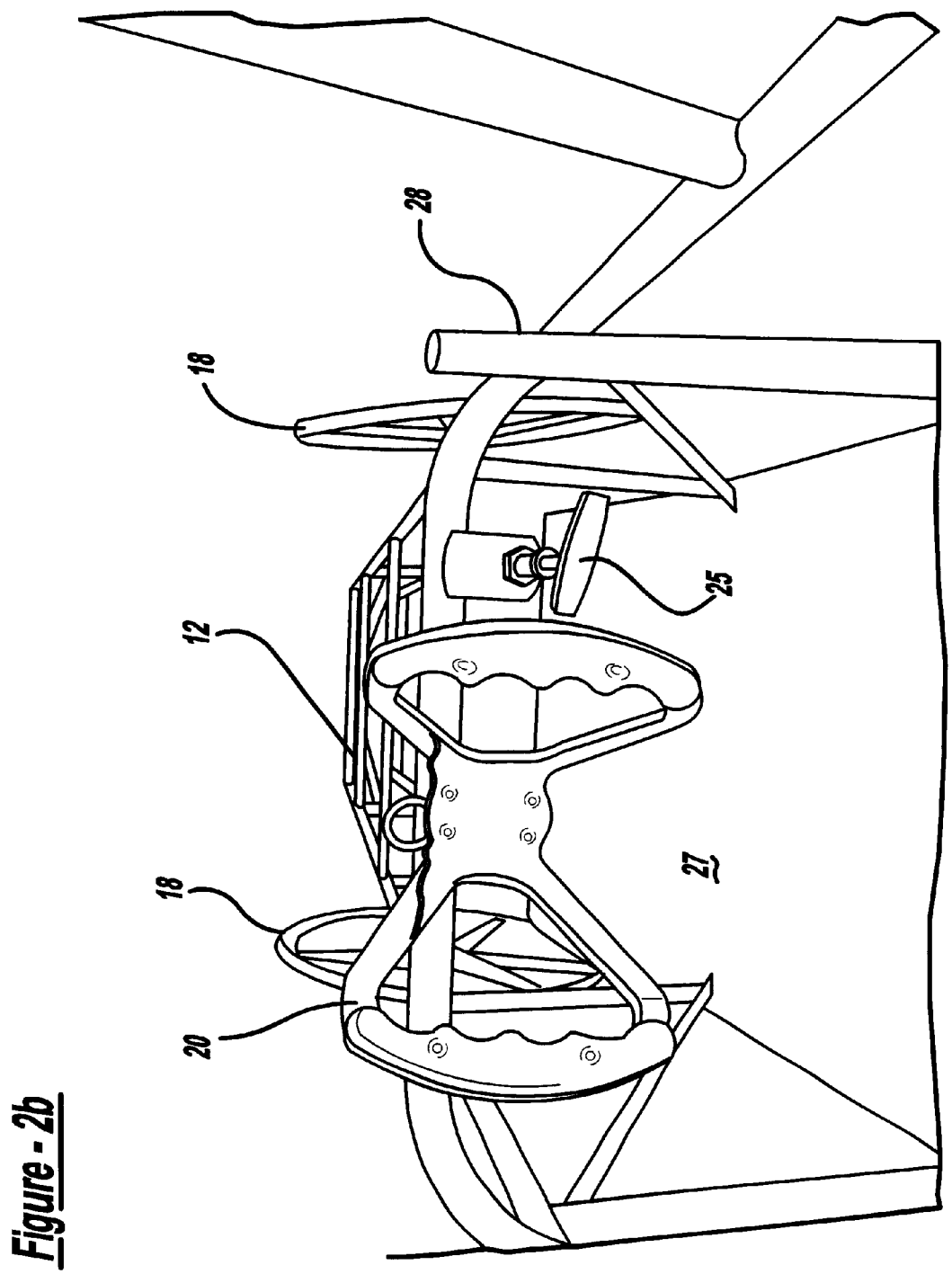
FIG. 2b is a partial perspective view of the front end of the vehicle of FIG. 1 from the operator compartment.
Figure 3:
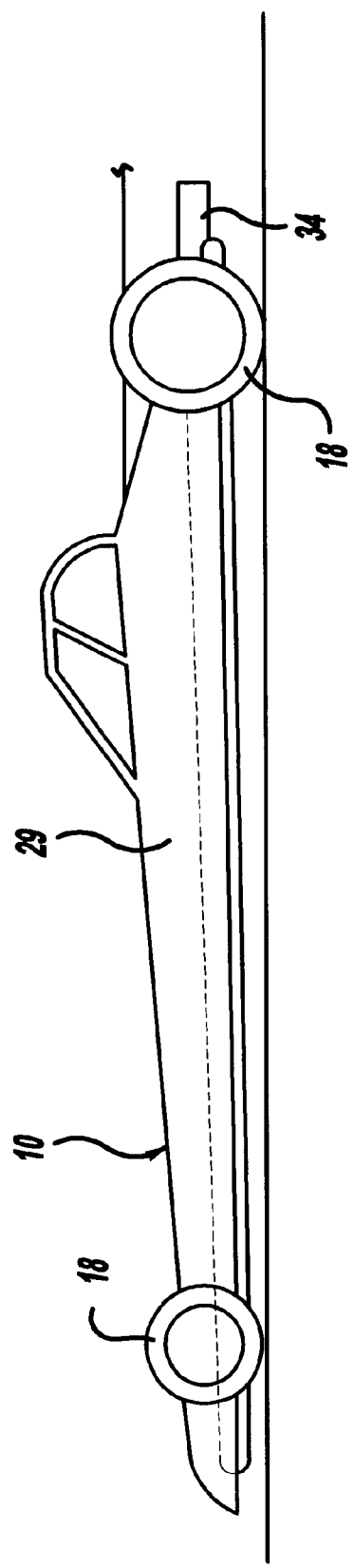
FIG. 3 is a schematic side view of one embodiment of a vehicle for use with an amusement ride according to the present invention.

FIGS. 1 and 2 show a basic vehicle frame 12, capable of utilizing the compressed fluid system 30 to propel the vehicle 10. As shown in FIG. 3, the invention contemplates a body or shell 29 placed over the frame 12 to simulate an actual drag race vehicle 10.

As shown in FIG. 4, the pressure sleeve 34 is slidably disposed over the pressure tube 32 in a telescopic relationship. The pressure sleeve 34 includes a closed or capped end 35 and an open end 37. The open end 37 of the pressure sleeve 34 is slid over a corresponding open and free end 33 of the pressure tube 32. As shown in FIG. 7, the pressure sleeve 34 slides over the pressure tube 32 until the open end 33 of the pressure tube 32 is adjacent or close to the capped end 35 of the pressure sleeve 34. A pair of o-rings 27 located in grooves 31 on the pressure tube 32 function to provide a seal between the pressure tube 32 and the pressure sleeve 34.

The compressed fluid system 30 further includes a tank 36 to store a source of compressed fluid, typically air. Attached to the tank 36 is a pressure source, such as a compressor, that raises the pressure in the tank 36 to a predetermined pressure. A primary valve 38 is connected to the tank 36 and shuts off pressure from the tank 36 to the remaining components of the compressed fluid system 30. During operation, the primary valve 38 remains open to all flow of compressed fluid from the tank 36 to the pressure tube 32.

As set forth above, during operation, the primary valve 38 is placed in the open position. Upon opening, a main dump valve 40, positioned between the pressure tube 32 and the tank 36, releases pressure from the tank 36 into the pressure tube 32. Pressure entering the pressure tube 32 acts on the capped end of the pressure sleeve 34 and operates to separate the pressure sleeve 34 from the pressure tube 32. Thus, the pressure enters the pressure tube 32 and correspondingly drives the pressure sleeve 34 off of the pressure tube 32. The force driving the pressure sleeve 34 off of the pressure tube 32 varies based upon the respective size of the pressure tube 32 and pressure sleeve 34 along with the amount of pressure and volume in the tank 36.

As illustrated in FIG. 1, the pressure sleeve 34 is attached to the frame 12 of the vehicle 10. Accordingly, when the pressure sleeve 34 is propelled away or separates from the pressure tube 32 it moves the vehicle 10. Attached to the main dump valve 40 is an actuator 42 that operates to open the main dump valve 40 when the operator/driver of the vehicle 10 provides a signal to do so, typically by engaging a switch 44. As shown in FIGS. 5, 6a and 6b, in one embodiment, the actuator 42 is an air driven actuator having a switch 44 coupled by an actuation cable 45 to a foot pedal 46 controlled by the vehicle operator/driver. As shown in FIG. 2b a handle 25, connected via the actuation cable 45, activates the switch 44. In the preferred embodiment, when the operator depresses the foot pedal 46, it pulls on the actuation cable 45 to activate the switch 44, which opens the main dump valve 40 to release pressure from the tank 36 into the pressure tube 32 and corresponding pressure sleeve 34. As set forth above, the pressure causes a separation of the pressure sleeve 34 from the pressure tube 32 and correspondingly moves the vehicle 10. The amount of pressure released from the tank 36 determines the speed and acceleration of the vehicle 10. It should be understood that once the vehicle 10 fully separates from the pressure tube 32 coupled to the tank 36 it is in free travel mode wherein the operator controls the direction of the vehicle 10.

The main dump valve 40 can be either a knife style, ball-type, butterfly, or any other fast-acting valve that can be utilized separately or in combination to achieve leak resistant filling of the pressure tank 36 and a subsequent quick release of pressurized fluid. Either manual, electrical solenoid or air piloted valves operated by a remote source or by the operator of the vehicle 10 are suitable for the switch 44 used control the actuator 42 that actuates the main dump valve 40. In an operator actuated or manual valve situation, the operator/driver physically actuates a button, lever, switch, or foot pedal that in turn sends a signal to the switch 44 enabling the actuator 42 to open the main dump valve 40. The actuator 42 used to open main dump valve 40 can be of air, mechanical, or electronic means. As shown herein, the actuator 42 is an air driven cylinder that upon receiving a suitable input opens the main dump valve 40. The air to drive the cylinder obtained from the pressure tank 36.

The switch 44 should be of a break away type to allow the vehicle 10 to separate from the actuator 42 once the main dump valve 40 is opened and the vehicle 10 is propelled forward. As shown in FIGS. 6a and 6b, one type of such a break away switch 44 is a driver-initiated switch 44 using a pin 48 that, when in place, depresses a normally open valve button 50. The switch includes an air input 52 receiving pressure from the air supply and an air output 54 connected to and supplying air pressure to the actuator 42. As shown, the valve button 50 is in the closed position i.e., the pin 48 depresses the valve button 50. Removal of the pin 48 by the operator/driver, via the actuation cable 45, or similar means as set forth above, allows the valve button 50 to return its normal open position. Accordingly, the resultant airflow through the air output 54 causes the actuator 42 to open the main dump valve 40 sending pressure to vehicle mounted pressure sleeve 34 to propel the vehicle 10. As shown, a safety pin 56 extends through an aperture 58 in the pin 48 to secure the pin 48 in place. Accordingly, the safety pin 56 must be removed before the switch 44 is active.

The switch 44 may also be electronic. The electronic switch uses a nonconductive material placed between two electrically conductive contacts. Thus, a normally closed valve is energized as soon as non-conducting material is pulled from between the contacts by operator/driver or other controlled source point enabling pressurized air flow to the actuator 42 which actuates the main dump valve 40. In an air piloted or air switch system, a two-line valve is mounted on the vehicle 10. An inlet pressure line is connected to the switch using a sleeve and o-ring. Air pressure from the inlet line keeps the normally open valve in a closed position. Once released, the valve opens and air pressure flows from the air outlet to operate the actuator 42. As the vehicle 10 moves, the air pressure inlet line separates from the switch 44 in a manner similar to the pressure tube 32 and pressure sleeve 34 combination whereby the respective ports have break-away capabilities.

It is further envisioned that the pressure sleeve 34 can be molded into a composite chassis of the vehicle 10 and not attached as a separate piece. A unique aspect of the compressed fluid vehicle 10, according to the present invention, is that there is no need for a dedicated track. The vehicle 10, after leaving the pressure tube 32 and tank 36 portion of the compressed fluid system 30, can be safely steered into an open area and slowed down using a typical drum, disc or similar friction-based braking system. In situations where a novice driver will be driving the vehicle, a cable guide wire system can be used with guide tubes or eyelets on the vehicle that attach to the guide wire and keep the moving vehicle on a near straight line path between two cable anchor points. Again, the vehicle 10 may be stopped by conventional braking systems or cable mounted compression springs where the vehicle, upon reaching a preset distance, contacts the compression springs and the forward energy is then absorbed.

The vehicle chassis or frame can be made of typical tube construction, molded composite, stamped metal or a combination of any of the types mentioned. To simulate drag race vehicles, a 6-point tubular roll cage positioned around the operator/driver can be utilized.

The vehicle 10 can be built to ride on a track having a T-bar or guide system 60, see FIG. 8, where wheels or rollers 62 fastened by support members 63 to the pressure sleeve 34 that is correspondingly attached to the vehicle frame 12. As shown, the wheels 62 capture portions of the track 60 to keep the vehicle on a guided yet low-friction path. The track-mounted version could resemble a land-speed vehicle, being low in drag, long and aerodynamic and effectively void of typical wheels 18. As shown in FIG. 8, a frame member 64 includes an upright 66 and a cross member 68. A pair of tubular members 70 or pipes are attached to the respective ends of the cross member 68. These tubular members 70 form the guide rails upon which the vehicle 10 runs. As shown, the opposed roller wheels 62 are secured to each side of the tubular members 70. The vehicle support frame 12 is attached to the pressure sleeve 34. It should be understood that the support members 63 may also be attached directly to the vehicle 10 itself. Other means or methods of attaching a vehicle 10 to a track may also be used while keeping within the scope of the present invention.

The tank 36 that holds the pressurized fluid is of a cylindrical shape. Any shape that is capable of containing the maximum pressure needed can be utilized. Because of its economical and inherently safe design, a cylindrical metal tank formed by spherically domed ends welded to a cylinder is used with the preferred embodiment shown.

Figure 9:
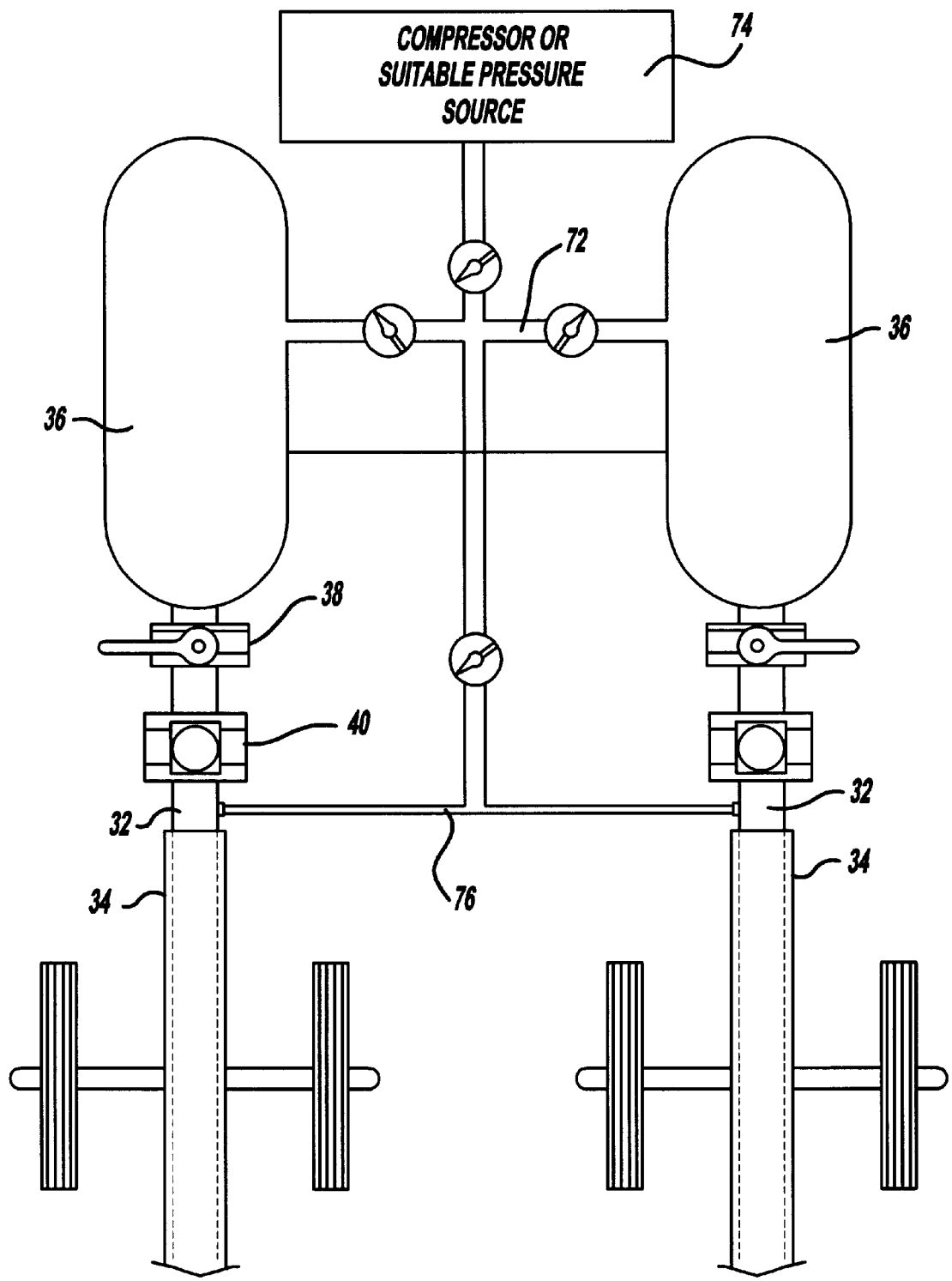
FIG. 9 is a schematic top view of a two vehicle amusement ride according to the present invention.

The present invention is also suitable for use in a drag race environment. As shown in FIG. 9, in a drag race situation where two or more vehicles for a race against each other, one tank can be used with two pressure tubes 32 and two main dump valves 40. In a two-tank system, pressures can be adjusted for purposes of creating a balanced race if driver weights are in disparity. The preferred drag race embodiment uses two tanks 36 coupled via a cross-tube 72. Equalizing pressure between the two tanks leads to a unique attribute in that the driver with the best reaction time to the Christmas Tree starting light system gains advantage over the slower reacting driver. To keep the pressure in the two tanks 36 ready for propulsion, a master tank or suitable pressure source such as a compressor 74 can be used to store pressurized fluid.

Another part of drag racing is the staging process. Drivers slowly move forward and cross light beams which turn on staging lights. These lights when turned on (for both drivers) let them know it is time to go. To simulate this staging process, a portion of air from the tank is directed into the pressure tube prior to opening the main dump valve 40. As shown in FIG. 9, a feed line 76 attaches to the pressure source 74 on one end thereof and to the respective pressure tubes 32 on the other end. The pressure and volume through the feed line 76 is controlled by a valve or regulator 78 in an amount suitable to advance the vehicle into the staging light beams. Resistance to this force is provided via the vehicle's braking system.

As set forth above, each of the vehicles shown in FIG. 9 may be mounted to a track or guide rail, such as that shown in FIG. 8. Again, the vehicle 10 is secured to the track or guide system to keep the vehicle 10 on a guided path and can be stopped using vehicle braking compression springs that are compressed against an end stop located at the end of the track. Another means of stopping the vehicle is with an elastic cord which catches the vehicle at a preselected distance on the track and slows the vehicle down.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. An amusement ride comprising:
   a vehicle;
   pressure receiver connected to said vehicle; and
   a pressure tube, said pressure tube connected to and receiving pressure from a pressure source, said pressure receiver includes a pressure sleeve slidably disposed over said pressure tube such that said pressure sleeve and said pressure tube fit together in a telescopic relationship, such that pressure released into said pressure tube drives said pressure receiver away from said pressure tube to impart motion to said vehicle.

2. An amusement ride as set forth in claim 1 including:
   a tank capable of storing a compressed fluid obtained from said pressure source, said tank connected to said pressure tube such that said compressed fluid flows from said tank to said pressure tube; and
   a dump valve, said dump valve disposed between said pressure tube and said tank, said dump valve having an open position enabling flow of said compressed fluid from said tank to said pressure tube and a closed position wherein flow is prevented.

3. An amusement ride as set forth in claim 2 including an actuator coupled to said dump valve, said actuator operative to move said dump valve between said open position and said closed position.

4. An amusement ride as set forth in claim 3 including a switch, said switch connected to said actuator, said switch operative to control said actuator and thereby operate said dump valve.

5. An amusement ride as set forth in claim 4 wherein said switch includes a foot activated pedal located on said vehicle; and
   a cable connected on one end thereof to said pedal and on the opposite end thereof to said actuator.

6. An amusement ride as set forth in claim 4 wherein said switch is a break-away switch that enables said vehicle to separate from said actuator.

7. An amusement ride as set forth in claim 4 wherein said switch includes a normally open valve, said normally open valve operative, when in an open state, to supply control pressure to said actuator to operate said dump valve; and
   a pin, said pin engaging a normally open valve button on said normally open valve, said pin holding said valve button in a closed position, wherein removal of said pin enables the valve button to return to a normally open position whereby control pressure acts on said actuator causing said actuator to open said dump valve.

8. An amusement ride as set forth in claim 4 wherein said switch is an electronic switch.

9. An amusement ride as set forth in claim 4 wherein said switch is an air piloted switch.

10. An amusement ride as set forth in claim 1 wherein said pressure tube includes at least one groove near an open end of said pressure tube; and
    an o-ring disposed in said groove, said o-ring operative to provide a seal between said pressure tube and pressure sleeve.

11. An apparatus for propelling a vehicle using a pressurized fluid comprising:
    a pressure receiver attached to the vehicle;
    a tank, said tank storing a supply of pressurized fluid;
    a pressure tube, said pressure tube connected to and receiving pressurized fluid from said tank;
    a dump valve disposed between said tank and said pressure tube, said dump valve operative to move between a first, open position and a second, closed position;
    an actuator connected to said dump valve, said actuator operative to move said dump valve between said first, open position and said second, closed position;
    a switch, said switch connected to said actuator to activate said actuator; and
    said pressure receiver includes a pressure sleeve slidably disposed over said pressure tube such that said pressure sleeve and said pressure tube fit together in a telescopic relationship, such that pressure released into said pressure tube drives said pressure receiver away from said pressure tube to impart motion to said vehicle.

12. An apparatus for propelling a vehicle as set forth in claim 11 wherein, said pressure sleeve being a tubular member having an open end and a closed end;

said pressure tube including an open end; and a seal member located on said pressure tube near said open end for providing a seal between said pressure sleeve and said pressure tube when said pressure sleeve is slidably disposed over said pressure tube.

13. An apparatus for propelling a vehicle as set forth in claim 11 including a track, said vehicle secured to said track such that the vehicle travels on a guided path.

14. An apparatus for propelling a vehicle as set forth in claim 13 wherein said track includes a frame having an upright member and a cross member;

a rail member attached to said cross member; and a pair of opposed roller wheels secured to the vehicle, said roller wheels situated on opposite sides of said rail member to capture said rail member therebetween and secure the vehicle to said track.

15. An apparatus for propelling a vehicle as set forth in claim 11 wherein said switch is a break-away switch that enables the vehicle to separate from said actuator.

16. A method for propelling a vehicle using a compressed fluid comprising the steps of:

providing a vehicle, said vehicle having a pressure receiver in a form of a pressure sleeve; attached thereto;

placing said pressure sleeve over a pressure tube such that said pressure sleeve and said pressure tube fit together in a telescopic relationship;

applying pressure from a pressure source through said pressure tube to drive said pressure receiver away from said pressure tube to propel the vehicle.

17. A method for propelling a vehicle as set forth in claim 16 wherein the step of applying pressure from a pressure source includes opening a dump valve located between said pressure source and said pressure tube.

18. A method for propelling a vehicle as set forth in claim 17 wherein the step of applying pressure from a pressure source includes activating a switch attached to an actuator, wherein said actuator operates to open and close the dump valve.

19. A method for propelling a vehicle as set forth in claim 16 wherein the step of applying pressure from a pressure source includes filling a storage tank to a predetermined pressure level;

utilizing a switch to activate an actuator, widens said actuator, opens a dump valve whereby pressure from said storage tank propels the vehicle.

* * * * *